ns patented July 3, 1962

3,042,539
PROCESS FOR THE PREPARATION OF ZINC OXIDE PIGMENTS
Lajos Csonka, Ferenc Horkay, Ferenc Szántó, János Szerecz, and Jenö Gönczy, all of Budapest, Hungary
No Drawing. Filed June 1, 1959, Ser. No. 817,026
Claims priority, application Hungary Jan. 15, 1959
2 Claims. (Cl. 106—296)

The invention relates to a process in which zinc oxide pigments in aqueous suspension are mixed with the solution of an anion active agent having a non-polar radical in an amount of 2.5 to 6.0% based on the pigment, the solution is heated, then the precipitated pigment is separated from the liquid, washed, if necessary, then dried and, if necessary, disintegrated.

As an anion active substance having a non-polar radical an alkali salt or ammonium salt of a fatty acid having at least 8 carbon atoms is used, preferably an alkali or ammonium salt of a fatty acid having 16 to 18 carbon atoms. In certain cases it has been found to be advantageous to use a salt of a fatty acid containing an OH-group, for example ricinoleic acid. One can also use a salt of industrial stearine, containing stearic acid, palmitic acid and oleic acid.

The use of alkali salts and ammonium salts of fatty acids has been proposed in U.S. Patent No. 1,722,174, for rendering lithopone organophilic. Lithopone is known to be a mixture of zinc sulfide and barium sulfate. The said patent proposes 0.1 to 2.0% soap for treating the pigment, and the aqueous suspension is not heated. This method is not suitable for giving the zinc oxide adequate organophilic properties, since zinc oxide is a compound of amphoteric character which is soluble in dilute lyes. The soaps mentioned above are hydrolyzed in water, whereby sodium hydroxide or ammonium hydroxide respectively is formed, compounds which, particularly when heated, will dissolve the zinc oxide. For this reason it was not to be expected that zinc oxide could be given such excellent organophilic properties by using soap in an amount exceeding 2.5%, preferably up to 6%, at a temperature in the range of 60° to 80° C. In the course of this treatment the organophilic anions probably will be bound to the zinc atom on the surface of the pigment particles, so that after drying they are fixed to the pigment surface with a great stabiilty. The lye formed in the course of the dissociation of these soaps has a peptizing effect on the larger aggregates of zinc oxide pigment, and decomposes them to primary particles. Hence, further surfaces come in contact with the organophilic agent so that in this manner an organophilic pigment of very fine particle size can be obtained. This phenomenon does not occur in the case of lithopone. When lithopone is treated with soap in an amount exceeding 2%, the pigment will not precipitate from the aqueous solution upon heating, but the soap solution having a higher concentration will maintain the pigment in suspension. The particle size of the lithopone in the suspension is not reduced during such a treatment. It is therefore clear that the step according to the invention has an unexpected effect in the case of zinc oxide.

*Example 1*

500 g. zinc oxide are suepnded in 2 liters of water, and 400 g. of an aqueous solution containing 4 weight percent ammonium stearate at 65 to 70° C. are added under brisk agitation. The mixture is heated to 65–70° C. while stirring. Thereupon the zinc oxide is fully precipitated from the suspension. The precipitated pigment is filtered, washed with a little water, dried at 60 to 100° C., and disintegrated in an edge runner. The organophilic zinc oxide so obtained has excellent wetting properties in aromatic and aliphatic hydrocarbons, it can be readily milled in lacquer base materials, oil lacquer and alkyd resins, giving very stable suspensions, and the films obtained therefrom are highly waterproof and the pigment particles will not migrate to the surface.

The following experiments have been conducted to prove the corrosion stability of the films containing such pigments:

Different amounts of ammonium stearate, that is, 0.2%, 1.0%, 2.5%, 6% by weight based on the pigment material have been used for rendering zinc oxide pigments organophilic, in accordance with the method described in Example 1. These pigments have been mixed to oil paints of the following composition: 29.9% linseed oil varnish, 20.4% lead white, 39.5% zinc oxide, 0.58% carbon black, 9.07% chrome yellow, 0.3% iron oxide red, 0.85% Prussian blue paste. The oil paints thus prepared, in which the above listed different amounts of ammonium stearate were incorporated have been spread on iron plates and after allowing to dry for a fortnight, a weather exposure test was effected comprising the following steps per cycle:

16 hours' standing in 20° C. dist. water,
Exposure to a 500 watt quartz lamp for 3 hours at a 50 cm. distance,
Standing in 20° C. dist. water for 0.5 hour,
Exposure by quartz light, as above for 2.5 hours,
Exposure to a 1% sulfur dioxide atmosphere for 1 hour,
Standing in a steam chamber of 100% relative humidity at 40° C. for 41 hours,
Exposure to quartz light illumination, as above, for 3 hours,
Standing in 20° C. dist. water, for 1 hour,
Quartz light, as above, for 3 hours,
Standing in 20° C. dist. water, for 16 hours,
Deep freezing at −15° C. for 8 hours.

After 20 cycles of treatment the following results have been established.

(1) Oil paint contaiinng untreated zinc oxide: Prior to testing, Erichsen elasticity 6.90 mm., cohesion 100%, after 20 cycles, elasticity 1.6 mm., cohesion 35%. The plate was corroded, rusted under the paint coating.

(2) Oil paint containing zinc oxide treated with 0.2% ammonium stearate: Prior to test, Erichsen elasticity 7.00 mm., cohesion 100%. After 20 cycles, elasticity 1.6 mm., cohesion 35%. Corrosion under the paint coating.

(3) Oil paint containing zinc oxide treated with 1% ammonium stearate: Prior to testing elasticity 7.4 mm., cohesion 100%. After 20 cycles, elasticity 2.3 mm., cohesion 40%. Slight corrosion under the paint coating.

(4) Oil paint containing zinc oxide treated with 2.5% ammonium stearate: Prior to testing, elasticity 3.5 mm., cohesion 70%. After 20 cycles, elasticity 3.5 mm., cohesion 70%. No corrosion.

(5) Oil paint containing zinc oxide treated with 3.2% ammonium stearate in accordance with Example 1: Prior to testing, elasticity 9.5 mm., cohesion 100%. After 20 cycles, elasticity 4.5 mm., cohesion 85%. No corrosion.

(6) Oil paint containing zinc oxide treated with 6.9% ammonium stearate: Prior to testing, elasticity 10.6 mm., cohesion 100%. After 20 cycles, elasticity 6.1 mm., cohesion 90%. No corrosion.

*Example 2*

The organophilic zinc oxide obtained according to Example 1 can be applied in diluents and binding agents of non-polar or slightly polar characteristics. An organophilic zinc oxide of good wetting and suspensibility in organic media of polar character, such as alcohols, ketones, esters and binding materials can be obtained by the method described in Example 1, but replacing the ammonium stearate with an equivalent amount of ammonium ricinoleate solution.

We claim:
1. A process for rendering zinc oxide pigments organophilic, comprising reacting an aqueous suspension of the pigment with a solution of a salt selected from the group consisting of alkali salts and ammonium salt of a fatty acid selected from the group consisting of fatty acids having 16 to 18 carbon atoms and a fatty acid having 18 carbon atoms and containing an OH-group, the alkali salt of the fatty acid being used in an amount of 2.5 to 6% based on the pigment weight, then heating the solution to a temperature in the range of 60° to 80° C., separating the precipitated pigment from the liquid, and drying and disintegrating it.

2. A process for rendering zinc oxide pigments organophilic as claimed in claim 1, in which the aqueous suspension of the pigment is mixed with a solution of a salt soluble in water and selected from the group consisting of alkali salts and ammonium salt of industrial stearine containing stearic acid, palmitic acid and oleic acid.

References Cited in the file of this patent

UNITED STATES PATENTS

| | | |
|---|---|---|
| 1,919,715 | Endres | July 25, 1933 |
| 1,946,052 | Baldwin | Feb. 3, 1934 |
| 2,036,570 | Depew | Apr. 7, 1936 |
| 2,065,687 | Gearhart et al. | Dec. 29, 1936 |
| 2,068,066 | O'Brien | Jan. 19, 1937 |
| 2,348,883 | Cyr | May 16, 1944 |

FOREIGN PATENTS

| | | |
|---|---|---|
| 1,157,560 | France | May 30, 1958 |
| 4,870 | Great Britain of 1893 | Jan. 13, 1894 |
| 432,032 | Great Britain | July 15, 1935 |